(No Model.)
M. E. THOMPSON.
ELECTRIC METER.
No. 425,269. Patented Apr. 8, 1890.
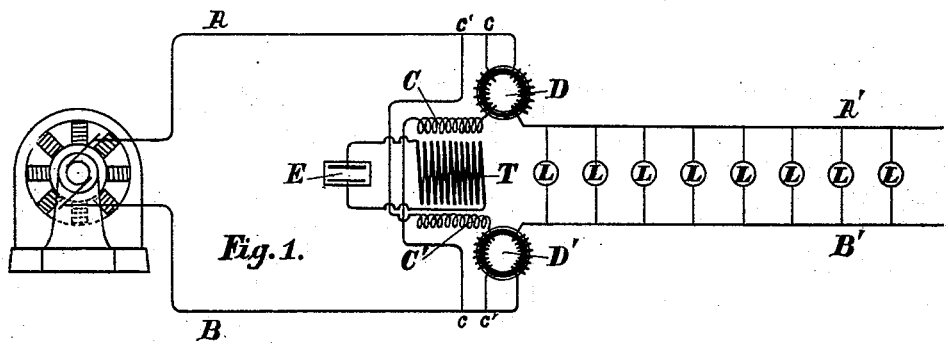
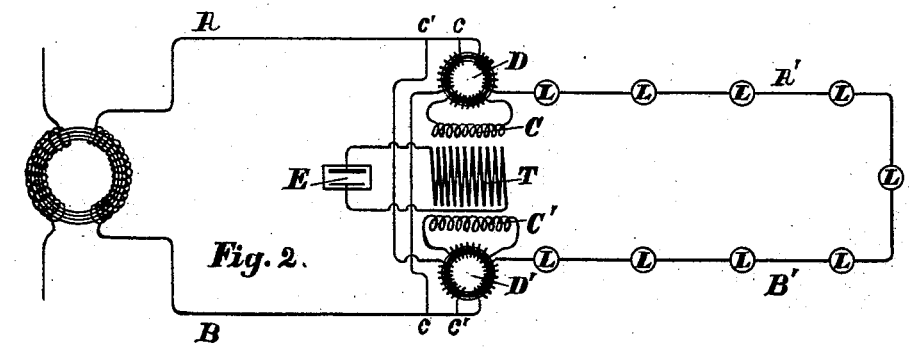
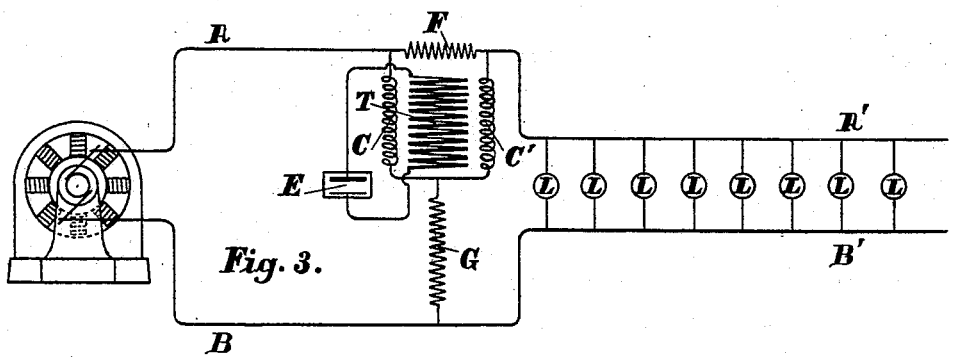
WITNESSES:
E. H. Kitfield
H. W. Adams.
INVENTOR.
M. E. Thompson
BY W. W. Curry
ATTORNEY.

UNITED STATES PATENT OFFICE.

MILTON E. THOMPSON, OF BOSTON, MASSACHUSETTS.

ELECTRIC METER.

SPECIFICATION forming part of Letters Patent No. 425,269, dated April 8, 1890.

Application filed June 4, 1889. Serial No. 313,085. (No model.)

*To all whom it may concern:*

Be it known that I, MILTON E. THOMPSON, a citizen of the United States of America, residing at Boston, in the county of Suffolk and State of Massachusetts, have invented certain new and useful Improvements in Electric Meters, of which the following is a specification, reference being had therein to the accompanying drawings.

My invention relates to improvements in meters for making a registration of electrical energy.

Heretofore no successful meter has been devised which will correctly measure both continuous and alternating currents, and none but mechanical meters have been used for alternating currents. These have been found objectionable, first, on account of their complicated nature and extreme liability to get out of order, and consequently give inaccurate registration; second, on account of their very great first cost; third, on account of the large amount of energy required to run them; fourth, on account of inaccuracies arising from the friction of moving parts; fifth, meters now in use if adjusted to give accurate measurements under full load, either give incorrect registrations under a very light load or fail to register altogether, and, sixth, nearly all meters now in use measure only the amount of current and take no account of the variations of potential; but as electrical energy is equal to the product of current and potential a meter should register this product, since both factors are necessary to correct measurement of the energy consumed.

The object of my invention is to provide a registering electric meter which shall actually measure the energy of either continuous or alternating currents, which shall be free from all mechanical contrivances and moving parts, at least such as may affect the accuracy of the registration, which shall be simple, reliable, and inexpensive, both as to the first cost and energy consumed in operating, and which shall correctly register throughout the whole of a long range the amount of energy being used by the consumer.

My invention consists, first, of an arrangement of coils, resistances, and wires, as hereinafter described, whereby a heating effect is produced which shall be proportional to the electrical energy to be measured.

My invention consists, further, of a registering apparatus for measuring the aforesaid heating effect, said apparatus consisting of a thermopile, whereby a portion of the aforesaid heating effect is converted into a continuous electric current, said continuous electric current being measured by means of an electrolytic cell.

In the accompanying drawings, Figure 1 is a diagram showing the general arrangement of the apparatus in connection with the thermopile. Fig. 2 is another method of arranging the coils and connections of the same apparatus. Fig. 3 is a diagram showing an arrangement of coils and resistances, whereby the heating effect peculiar to my invention may be produced without the aid of induction, thereby rendering my meter applicable equally to continuous, alternating, or pulsating currents of any kind.

In Fig. 1, A A' and B B' are the mains or service-wires carrying the current to be measured, and it is immaterial whether these run to a transformer or dynamo. L L L, &c., represent the lamps, motors, or other apparatus of any kind whose consumption of electrical energy is to be measured. These may be arranged in multiple or series, or both, since the meter registers variations of both current and potential. In Fig. 1 they are shown arranged in multiple, and in Fig. 2 they are shown in series. The meter should be installed as close to the apparatus as possible. C is a non-inductive heating-coil forming part of the shunt $c\ c$, which shunt is arranged between the mains A A' B B'. Shunt $c\ c$ also carries the secondary coil of the small induction-coil D, the primary of induction-coil D being formed by a part of the main A A'. C' is a similar non-inductive heating-coil forming part of the shunt $c'\ c'$, which shunt is arranged across the mains A A' and B B' in a manner similar to $c\ c$. Shunt $c'\ c'$ carries the secondary of the induction-coil D', the primary of this induction-coil being a part of the main B B'. T is a thermopile constructed of such materials and in such a manner as may be found best suited for the purpose in view—namely, the conversion into a continuous electric current of the difference of heat energy radiated from the heating-coils C and C'. Coil C radiates its heat upon one face of the thermopile and coil C' upon the other. E is an electrolytic cell of such construction as shall be found best suited for the purpose in view—namely, the measurement of the electric current developed by the thermopile T. This cell is placed in circuit with the thermopile, a resistance being included in the circuit, if necessary.

The action of the apparatus is as follows: The current to be measured passes through mains or service-wires A A' and B B' to the lamps or other apparatus L. The shunts $c\,c$ and $c'\,c'$, being in parallel with the lamps L, receive an electro-motive force, which is the same as that which is driving the current through the lamps. Call this electro-motive force $x$. The current in these shunts is also due to an electro-motive force impressed by the induction-coils D and D', and this electro-motive force is proportional to the current through the mains A A' and B B', or to the current through the lamps. Call this electro-motive force $y$. In the case of shunt $c\,c$ this last-named electro-motive force $y$, by a proper arrangement of the coils of induction-coil D, is made to act in conjunction with $x$; hence the resultant electro-motive force in heating-coil C, and consequently the current in the same, is proportional to $(x+y)$ the sum of the two electro-motive forces mentioned above. In the case of $c'\,c'$ the two electro-motive forces are made to act in opposition, so that the resultant electro-motive force and current in heating-coil C' is proportional to $(x-y)$ the difference of the two electro-motive forces mentioned above. The heating effect of a current is proportional to the square of the current. Therefore the heat developed in coil C is proportional to $(x+y)^2$, and in coil C' to $(x-y)^2$. The heat of coil C is radiated upon one face of the thermopile T and the heat of coil C' upon the other. Now the electrical energy developed by a thermopile is proportional to the difference of temperature of its two faces, and therefore in this case it is proportional to the difference of the heat radiated from coils C and C'; but the difference of heat radiated from coils C and C' is equal to the difference of $(x+y)^2$ and $(x-y)^2$, which is $4xy$; hence the current developed by the thermopile is proportional to $xy$. Now the energy of an electric current is equal to the product of the current by its electro-motive force. $x$ is proportional to the electro-motive force acting upon the lamps L, and $y$ is proportional to the current passing through the same lamps; hence $xy$ is proportional to the energy being consumed in the lamps, and therefore the current developed by the thermopile is proportional to the energy consumed in the lamps, motors, and other apparatus. The current from the thermopile passes through the electrolytic cell E and dissolves an amount of metal from one electrode, depositing the same upon the other, and the weight of the metal so dissolved and deposited is proportional to the current, and consequently to the energy consumed, and which it is desired to measure. By weighing the electrodes before and after a run of the apparatus I am able to determine from the gain or loss in weight the amount of electrical energy which has been consumed in the lamps, motors, or other apparatus.

Fig. 2 shows the lamps or other apparatus L arranged in series. The construction of the meter is the same as in Fig. 1, with the exception that the heating-coils C and C', instead of forming parts of shunts $c\,c$ and $c'\,c'$, are placed in the circuits of independent coils, each of the induction-coils D and D' having three coils, one in the service-wire, one in the shunt, and the other in circuit with the heating-coil. The action of the apparatus is identical with that of Fig. 1.

Fig. 3 is an arrangement of shunts and resistances by means of which the same heating effects as above are obtained without the use of induction, thus making the meter applicable to direct currents. A A' and B B' are the mains or service-wires, and L the lamps or other apparatus. F and G are non-inductive resistances, and C C' are non-inductive heating-coils. T is a thermopile, and E an electrolytic cell, as before. The action of this device is as follows: Let $a$, $b$, $c$, and $d$ represent the resistances in ohms of coils F, C, C', and G, respectively, and let $m$, $n$, $x$, and $y$ represent the respective currents flowing through said coils. Let $r$ represent the resistance of the lamps or other apparatus L, and $i$ the the currents of the same. Then, neglecting the resistance of the wires between the meter and the lamps, which should be very small at any rate, we have according to the laws of Ohm and Kirchoff $$m+x=i \qquad ma=xc+nb$$
$$n=x+y \qquad xc+ir=yd$$

Solving these equations we have $$x=\mathrm{K}(ad-br)i$$
$$n=\mathrm{K}(ac+ad+(c+a)r)i$$
$$y=\mathrm{K}(ac+(c+a+b)r)i$$
$$m=\mathrm{K}(bd+dc+bc+br)i$$

wherein $\mathrm{K} = \dfrac{1}{ad+bd+cd+bc}$

There are many ways of proportioning and combining the four resistances F, G, C, and C' in order to accomplish the desired end—namely, the production of two heating effects whose difference shall be proportional to the energy consumed in the apparatus L. One of the simplest and most effective is to make $$b=c=\sqrt{ad}$$

Then
$$\mathrm{K} = \dfrac{1}{2b(b+d)}$$
$$x=\mathrm{K}b(b-r)i=\text{current in } \mathrm{C}'$$
$$n=\mathrm{K}(a+b)(b+r)i=\text{current in } \mathrm{C}$$

Now we will use all the heating effect of the coil C', but only a part of that of C, and if $r_x$ and $r_n$ represent the resistances, whose heating effect we propose to use in coils C' and C, respectively, then $x^2 r_x$ and $n^2 r_n$ will be the available heating effects of the two coils.

Make $r_x = b$ and $r_n = \dfrac{b^3}{(a+b)^2}$

Then $x^2 r_x = b \dfrac{(b^2 - 2br + r^2)i^2}{4(b+d)^2}$

And $n^2 r_n = b \dfrac{(b^2 + 2br + r^2)i^2}{4(b+d)^2}$

Hence $n^2 r_n - x^2 r_x = \dfrac{b^2 r i^2}{(b+d)^2}$. Now $\dfrac{b^2}{(b+d)^2}$ is a constant and $ri = e$, the electro-motive force acting on the lamps, motors, or other apparatus; hence $ri^2$ is the product of the current through the apparatus L by the electro-motive force through said apparatus. Therefore, the difference of the two heating effects is equal to the energy consumed in apparatus L times a constant which is readily determined. In Fig. 3 these two heating effects are applied to the opposite faces of the thermopile T, and the resultant continuous current is measured by means of the electrolytic cell E, as before mentioned.

I do not confine myself to any special form of construction in the apparatus described, but claim broadly the general ideas at set forth, and they may be embodied in such special forms of construction as shall be found in practice to be the best suited to the end in view.

Having thus fully described my invention, what I claim as new, and desire to secure by Letters Patent, is—

1. In an electric meter dependent upon the heating effect of the current, the combination, with any device for registering said heating effects, of a plurality of heating-coils producing two heating effects, whose difference shall be proportioned to the electrical energy which is to be measured, substantially as herein shown and described.

2. In an electric meter dependent upon the heating effect of the current, the combination, with a plurality of heating-coils, of an arrangement of shunts and induction-coils or shunts and resistances, which shall so determine the currents through said heating-coils that two heating effects shall be produced whose difference shall be proportional to the electrical energy to be measured, substantially as herein shown and described.

3. In an electric meter dependent upon the heating effects of the current, the combination, with an arrangement of shunts and induction-coils or shunts and resistances for determining the currents through a plurality of heating-coils, of a plurality of heating-coils for producing from said currents two heating effects whose difference shall be proportional to the electrical energy to be measured, and a thermopile for producing from said difference of heating effects a continuous electric current, substantially as shown and described.

4. In an electric meter dependent upon the heating effects of the current, the combination, with any device for producing two heating effects whose difference shall be proportional to the energy to be measured, of a thermopile for converting said difference of heating effects into a continuous electric current which shall be proportional to the energy to be measured, substantially as herein shown and described.

5. In an electric meter dependent on the heating effect of the current, the combination, with a thermopile producing a continuous electric current proportional to the energy to be measured, of an electrolytic cell for measuring the energy of said continuous current, substantially as herein shown and described.

6. In an electric meter dependent on the heating effect of the current, the combination, with a plurality of heating-coils producing two heating effects whose difference is proportional to the electric energy to be measured, of a thermopile for producing from said difference of heating effects a continuous electric current proportional to the electric energy to be measured and an electrolytic cell for measuring the energy of said continuous electric current, substantially as herein set forth and described.

7. In an electric meter dependent upon the heating effects of the current, the combination, with an arrangement of shunts and induction-coils or shunts and resistances for determining the currents through a plurality of heating-coils, of a plurality of heating-coils for producing from said currents two heating effects whose difference shall be proportional to the electrical energy to be measured, a thermopile for producing from said difference of heating effects a continuous electric current, and an electrolytic cell for measuring the energy of said continuous electric current, substantially as set forth and described.

In testimony whereof I affix my signature in presence of two witnesses.

MILTON E. THOMPSON.

Witnesses:
E. H. KITFIELD,
H. C. WIRT.